United States Patent Office 3,532,664
Patented Oct. 6, 1970

3,532,664
SILANOL-CONTAINING ORGANOPOLYSILOXANE COMPOSITIONS
Alfred H. Smith, Jonesville, N.Y., assignor to General Electric Company, a corporation of New York
No Drawing. Filed Jan. 6, 1969, Ser. No. 789,353
Int. Cl. C08g *51/04;* C08s *1/02*
U.S. Cl. 260—37
24 Claims

ABSTRACT OF THE DISCLOSURE

Organopolysiloxane compositions are provided having a substantially constant viscosity over an extended period of time comprising a silanol-containing organopolysiloxane fluid and a pyrogenic silica filler which is substantially free of infrared absorbance at 3760 cm.$^{-1}$. These silanol-containing organopolysiloxane compositions can be employed to make room temperature vulcanizing compositions.

---

The present invention relates to organopolysiloxane compositions comprising silanol-containing organopolysiloxane and pyrogenic silica filler useful for making room temperature curable mixtures convertible to high strength organopolysiloxane elastomers.

Pyrogenic silica filler having a surface area of at least 50 square meters per gram has generally been recognized as a valuable reinforcing material for organopolysiloxane elastomers. Such pyrogenic silica filler is usually preferred over other reinforcing fillers such as carbon blacks, and precipitated silica fillers because it can be manufactured in a highly purified state and is substantially color free.

Experience has shown that when pyrogenic silica filler is blended with an organopolysiloxane, there is invariably a tendency for the resulting polymer-filler blend to harden or to "structure." In instances where the polymer is an organopolysiloxane having terminal triorganosiloxy, such as trimethylsiloxy chain-stopping units, and substantially free of silanol radicals, such as an organic peroxide curable organopolysiloxane gum, a process aid such as diphenylsilanediol can be employed to reduce structure. Another method which has been employed to reduce structure in blends of organopolysiloxane and pyrogenic silica filler, is to employ pyrogenic silica which has been treated with a cycloalkylpolysiloxane in accordance with the teaching of Lucas Pat. 2,938,009, assigned to the same assignee as the present invention. Additional benefits have been achieved by utilizing a combination of process aid and treated pyrogenic silica filler with such heat curable organopolysiloxane gums. As a result of the many techniques developed to minimize structure with conventional heat curable blends of organopolysiloxane gums and pyrogenic silica filler, pyrogenic silica filler has been widely employed as the principal reinforcing material for making high strength heat cured organopolysiloxane elastomers.

Although high strength elastomers have been provided by heat curable blends of organopolysiloxane gums, reinforced with pyrogenic silica filler prior to the present invention, it was not possible to make high strength elastomers, i.e., elastomers having a tensile strength (p.s.i.) of at least 1000, from room temperature vulcanizing organopolysiloxane compositions. Those skilled in the art know, for example, that when untreated pyrogenic silica filler, or such filler treated with cycloalkylpolysiloxane in accordance with the above-described Lucas method is mixed in reinforcing amounts with silanol-containing organopolysiloxane fluid, the resulting blend invariably reverts to an unflowable paste. Experience has shown that in most instances, a blend of pyrogenic silica filler and a silanol-containing organopolysiloxane fluid which has reverted to the unflowable state can be "wetted out" or rendered flowable by vigorous stirring over an extended period of time. A longer wetting out period is required if untreated filler has been employed. Even though a flowable mixture can be obtained by a wetting out technique, it generally has a viscosity considerably higher than that obtained from typical blends of organopolysiloxane polymers and non-reinforcing fillers. In addition, even after being wetted out, the mixture can readily revert to a still higher viscosity and rendered useless if left standing for as little as a month or less. Prior to the present invention, therefore, mixtures of pyrogenic silica filler and silanol-containing organopolysiloxanes generally were not suitable for making room temperature vulcanizing organopolysiloxane compositions unless the blend of pyrogenic silica filler and silanol-containing organopolysiloxane mixture was immediately utilized.

The present invention is based on the discovery that a pyrogenic silica filler having a surface area of at least 50 square meters per gram, which is substantially free of infrared absorbance at 3760 cm.$^{-1}$, and having up to 20 percent by weight based on the weight of filler of chemically combined triorganosiloxy units of the formula, (1) $\quad R_3SiO$ where R is selected from monovalent hydrocarbon radicals and halogenated monovalent hydrocarbon radicals, can be employed in combination with a silanol-containing organopolysiloxane fluid to produce a blend having a substantial constant viscosity over an extended period of time. The resulting blend of pyrogenic silica filler and silanol-containing organopolysiloxane fluid also can be employed to make organopolysiloxane compositions curable at room temperature and convertible to high strength organopolysiloxane elastomers having improved tear strength (p.i.) and elongation (percent).

In accordance with the present invention, there is provided an organopolysiloxane composition having a substantially constant viscosity over an extended period of time comprising:

(A) 100 parts of an organopolysiloxane having a viscosity up to 500,000 centipoises at 25° C. consisting essentially of chemically combined units of the formula, (2) $\quad R'_2SiO$ and terminal units selected from, (i) silanol units of the formula, (3) $\quad HOR'_2SiO$ and (ii) a mixture of (i) and organosiloxy chain-stopping units of the formula, (4) $\quad R''R'_2SiO$ wherein (ii), the ratio of (i) to the organosiloxy chain-stopping units has a value exceeding 1, and (B) 10 to 50 parts of a pyrogenic silica filler having a surface area of at least 50 square meters per gram, and from about 1 to about 20 percent by weight of chemically combined triorganosiloxy units of Formula 1, which is substantially free of infrared absorbance at 3760 cm.$^{-1}$, where R' is selected from monovalent hydrocarbon radicals, halogenated monovalent hydrocarbon radicals and cyanoalkyl radicals, R" is selected from R radicals and R$_3$CO radicals and R is as previously defined.

Radicals included by R of Formula 1, are for example, mononuclear and binuclear aryl radicals such as phenyl, tolyl, xylyl, naphthyl, etc.: hola mononuclear and binuclear aryl radicals such as chlorophenyl, chloronaphthyl, etc.; mononuclear aryl lower alkyl radicals having from one to 8 carbon atoms per alkyl group such as benzyl, phenylethyl, etc.; lower alkyl radicals having from 1 to 8 carbon atoms such as methyl, ethyl, propyl, butyl, pentyl, hexyl, heptyl, octyl, etc.; lower alkenyl radicals having 2 to 8 carbon atoms such as vinyl, allyl, 1-propenyl, etc.; halo lower alkyl radicals having from one to 8 carbon atoms such as chloropropyl, trifluoropropyl.; cycloalkyl radicals such as cyclobutyl, cyclopentyl, cyclohexyl, etc. Radicals included by R′ are all of the aforementioned R radicals and cyano lower alkyl radicals having from 2 to 6 carbon atoms such as cyanoethyl, cyanopropyl, cyanobutyl, etc. Radicals included by R″ are R radicals and $R_3CO$ radicals. For example, R″ can include in addition to R radicals, tertiary alkoxy radicals such as tertiary butoxy, tertiary amyloxy, etc.

Some of the silanol-containing organopolysiloxanes which can be utilized in the practice of the present invention includes silanol-terminated polydiorganosiloxane fluids of the formula, (5) 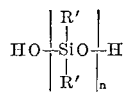

where R′ is as previously defined, and $n$ is an interger equal to one to 1000 inclusive. These fluids can have viscosities in the range of 500 centipoises to 500,000 centipoises at 25° C. These silanol-terminated polydiorganosiloxanes can be made by treating a polydiorganosiloxane, such as a polydimethylsiloxane with water in the presence of a suitable acid or base catalyst to tailor the viscosity of the polymer to the desired range. Polydiorganosiloxane which can be employed to make the silanol-terminated polydiorganosiloxanes can be made by conventional equilibrium procedures by heating a cyclic polydiorganosiloxane, for example, a cyclic polysiloxane containing from 3 to about 8 chemically combined diorganosiloxy units such as dimethylsiloxy units, methylphenylsiloxy units, methylvinylsiloxy units, etc., in the presence of a basic catalyst, such as potassium hydroxide. In order to convert the polydiorganosiloxane made by equilibrating the aforementioned polydiorganosiloxane to silanol-terminated polydiorganosiloxane having a particular viscosity, water can be added to the polydiorganosiloxane and the mixture heated between 150° C. to 200° C. for 6 hours or less. The mixture can then be decatalyzed and stripped to the desired viscosity. In instances where silanol-terminated polydiorganosiloxane is desired having a viscosity below 1200 centipoises at 25° C., steam pressure can be employed.

In addition to the silanol-terminated polydiorganosiloxanes of Formula 5, the silanol-containing organopolysiloxanes which can be employed in the practice of the present invention also include mixtures of such silanol-terminated polydiorganosiloxanes and silanol-containing organopolysiloxanes of the formulas (6)      R″(R′$_2$SiO)$_m$H where all of the terms are as previously defined. The silanol-containing organosiloxane of Formula 6 can be utilized in combination with the silanol-containing polydiorganosiloxanes of Formula 5 in amounts effective to provide for organopolysiloxane mixtures having a ratio of the sum of R′ and R″ radicals to silicon from 1.95 to 2.01. The silanol-containing organopolysiloxanes of Formula 6 can be made by equilibrating a mixture of from .01 to 20 mole percent of R″$_3$SiO$_{0.5}$ units, and 80 mole percent to 99.99 mole percent of R″$_2$ SiO units. Small amounts of RSiO$_{3/2}$ units can also be present provided the ratio of the sum of the R, R′ and R″ to Si does not fall below 1.95. The silanol-containing organopolysiloxanes of Formula 6 also can contain from 0.02 to 8 percent by weight of hydroxy radicals attached to silicon, based on the total weight of silanol-containing organopolysiloxane. In addition, these materials can have viscosities up to 50,000 centipoises at 25° C.

Methods of making the silanol-containing organopolysiloxanes of Formula 6 are shown in copending application, Ser. No. 634,828 of Melvin D. Beers, filed May 1, 1967, now Pat. No. 3,438,930, and assigned to the same assignee as the present inventilon, For example, tert-alkoxydiorganosilane of the formula,

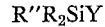

can be employed in combination with silanol-terminated polydiorganosiloxane of Formula 5, where Y is a hydrolyzable radical. Included by R″R$_2$SiO$_{0.5}$ chain-stopping units are for example, $(CH_3)_3CO(CH_3)_2SiO_{0.5}$, $(CH_3)_3SiO_{0.5}$, $(CH_3)_2C_6H_5SiO_{0.5}$, $C_2H_5(CH_3)_2CO(CH_3)_2SiO_{0.5}$, etc.

The pyrogenic silica filler utilized in the practice of the invention can have a surface area of at least 50 square meters per gram, and preferably 150 to 500 square meters per gram. The pyrogenic silica filler can be made from silica filler produced by burning silanes, for example, silicon tetrachloride, trichlorosilane, etc., as taught by Spialter et al., Pat. 2,514,906, Hugh et al., Pat. 3,043,660, etc. Provided sufficient water is present, either as water absorbed on the surface of the filler resulting from normal contact with atmospheric moisture, or added externally, such as from 0.2 percent to 1 percent by weight of water, based on the weight of silica filler, such silica filler produced by the aforementioned fuming methods can be directly silylated.

Silylation of the pyrogenic silica filler can be achieved by contacting the filler at a temperature of from 20° C. to 150° C. with from 3 percent to 25 percent by weight of the silica filler of a silylating agent of the formula, (R$_3$Si)$_a$Z where R is as previously defined, $a$ is an integer equal to one or 2, and Z is a radical selected from —OH, —NRX, —ONR$_2$, —SR,

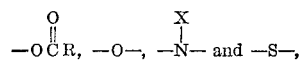

where X is selected from the group consisting of H and R where R is as above defined and is preferably H, lower alkyl or cycloalkyl. Silylating agents included by the above formula are for example, triorganosilylmercaptans, triorganosilylacylates, triorganosilylamines for example, trimethylsilylisopropylamine, trimethylsilylamine, dimethylphenylsilylamine, dimethylvinylsilylamine, etc.; triorganosilylaminoxy compounds, such as diethylaminoxytrimethylsilane, diethylaminoxydiethylphenylsilane; silylating compounds shown by Klebe, Pat. 3,397,220, assigned to the same assignee as the present invention, etc. There also can be employed disilyl compounds such as disiloxanes for example, hexamethyldisiloxane, 1,3-divinyltetramethyldisiloxane, 1,3-diphenyltetramethyldisiloxane, etc.; silazanes such as hexamethyldisilazane, 1,3-diphenylhexamethyldisilazane, etc.

Preferably, the above-described filler is pretreated with ammonia, or ammonia derivatives such as primary amines, for example, isopropylamine, hydroxylamine compounds such as diethylhydroxylamine, but preferably ammonia, etc., prior to silylation with the above-described silylating agents. A further treatment with an alkylcyclopolysiloxane such as octamethylcyclotetrasiloxane prior to such silylation and either before or after treatment with ammonia is particularly preferred. For example, untreated silica filler made by burning a chlorosilane can be contacted with at least 0.25 per cent by weight of ammonia by vigorously agitating the filler in an ammonia atmosphere at atmospheric pressures at temperatures between 20° C. to 150° C. at periods of between ½ hour to 72 hours. The resulting silica filler after such contact with ammonia can be further treated with an alkylcyclopolysiloxane in accordance with standard techniques as described by the aforementioned Lucas patent. Alternatively, the treatment of the filler with the aforementioned alkylcyclopolysiloxane can precede the contact with ammonia.

After the filler has been contacted with ammonia and the alkylcyclopolysiloxane, it can be silylated with any one or more of the above described silylating agents at temperatures of between 20° C. to 150° C. for 2 hours or less to 7 days or more. The optimum silylating conditions will depend upon the particular choice of silylating agent employed. In instances where the silica filler has been contacted with alkylcyclopolysiloxane, effective results can be achieved when the silica is silylated to provide for as little as 1 percent by weight based on the weight of untreated silica filler employed, of chemically combined triorganosiloxy units depending upon the surface area of the silica used. Contact of the silica filler with alkylcyclopolysiloxane can be effected in accordance with the teaching of Lucas. Excess alkylcyclopolysiloxane can be stripped from the surface of the silica to achieve a treated silica having absorbed or chemisorbed diorganosiloxy units, such as dimethylsiloxy units. Effective treatment will provide for from 5 to 10 percent by weight of permanently associated dimethylsiloxy units, if octamethylcyclotetrasiloxane is employed. In the absence of treating the filler with alkylcyclopolysiloxane, it has been found that from about 6 to 20 percent by weight of chemically combined triorganosiloxy units of Formula 1 can be employed. In instances where the triorganosiloxy units are trimethylsiloxy units, optimum results can be achieved with from 6 to 12 percent by weight based on the weight of the untreated filler.

The silanol-containing organopolysiloxane composition of the present invention, or "blend" can be made by merely mixing the silanol-containing organopolysiloxane or silanol "fluid" with the pyrogenic silica filler or "filler."

The degree of mixing will depend upon such factors as the initial viscosity of the silanol fluid, the amount of silica filler utilized, and the employment of other materials in the blend. For example, there can be utilized a silanol-free polydiorganosiloxane fluid, consisting essentially of, for example, chemically combined $(CH_3)_2SiO$ units having viscosities in the range of from 5 to 200 centipoises at 25° C. The silanol-free fluid can have terminal $(CH_3)_3SiO_{0.5}$ units instead of silanol radicals and can be employed to reduce the modulus of the resulting cured elastomers at from 5 to 70 parts by weight, per 100 parts of the silanol fluid. In addition, process aid can be employed, such as utilized in Beers Pat. 3,382,205 assigned to the same assignee as the present invention, and from 1 to 17 parts by weight of process aid, per 100 parts of silanol fluid. In addition to silanol-free polydiorganosiloxane fluids and process aids, there can be employed pigments, heat stabilizers, such as iron oxide, cerium neodeconate, etc., extending fillers such as diatomaceous earth, calcium carbonate, ground quartz, etc. There can be employed from 1 to 50 parts by weight of extending filler, per 100 parts of the silanol fluid. The total parts of the extending filler and silica filler which can be utilized, per 100 parts by weight of the silanol fluid can vary from 11 to 85 parts, and preferably 25 to 50 parts. Effective results, for example, can be achieved if at least 25 parts and up to 35 parts of the silica filler is employed.

There also can be used in the silanol-containing organopolysiloxane composition or blend, curing agents such as organosilicates in particular instances as taught by Berridge, Pat. 2,843,555, assigned to the same assignee as the present invention. Such mixtures of the silanol fluid, filler and curing agent will remain stable at 0 to 30° C. for an indefinite period of time. Room temperature cure of the mixture can be achieved by the addition of a suitable curing catalyst which also is as shown in the aforementioned Berridge patent. For example, there can be employed curing catalysts such as dibutyl tin dilaurate, stannous octoate, etc., at from .08 to 0.5 part by weight of catalyst, per 100 parts by weight of the silanol fluid.

The blend also can be employed to make "one-package" room temperature vulcanizing compositions when utilized under substantially anhydrous conditions and when the blend itself is substantially free of water as taught in copending application, Ser. No. 789,354 filed Jan. 6, 1969, filed concurrently herewith and assigned to the same assignee as the present invention.

In order that those skilled in the art will be better able to practice the invention, the following examples are given by way of illustration and not by way of limitation. All parts are by weight.

EXAMPLE 1

Pyrogenic silica filler having a surface area of about 200 square meters per gram was treated with octamethylcyclotetrasiloxane in accordance with the teaching of Lucas Pat. 2,938,009. The resulting treated filler was then highly agitated for 3 hours at 25° C. in an ammonia atmosphere. Ammonia was passed over the surface of the filler at a flow rate of about 0.2 cubic foot per hour. There was then added to the filler while it was agitated, 7½ percent by weight of the filler of hexamethyldisilazane. The resulting mixture was then heated to 130° C. for 4 hours. There was then added enough water to equal about .5 percent by weight of the filler and the filler was further heated while it was vigorously agitated for 2 hours at 130° C. The filler was then dried in an oven for 24 hours at 150° C. There was obtained a filler which was free of infrared absorbance at 3760 cm.$^{-1}$. The filler had about 2.2 percent by weight of chemically combined trimethylsiloxy units. The percent by weight of chemically combined trimethylsiloxy units was determined by carbon and hydrogen analysis using a Perkin Elmer 240, Carbon, Hydrogen-Nitrogen Analyses. Analysis was measured in terms of carbon dioxide and water derived by burning the sample. Confirmation was achieved by infrared analysis.

A mixture of 25 parts of the above treated pyrogenic silica filler and 100 parts of a silanol-terminated polydimethylsiloxane having a viscosity of about 300 centipoises at 25° C. was prepared by incrementally adding the filler to the organopolysiloxane fluid while stirring the resulting mixture. After the filler had been completely added, there was obtained a silanol-containing polydimethylsiloxane composition having a viscosity of about 400,000 centipoises at 25° C.

The above procedure was repeated, except that in place of the pyrogenic silica filler utilized in the practice of the invention, there was employed a pyrogenic silica filler treated with octamethylcyclotetrasiloxane in accordance with the above-described Lucas patent. The pyrogenic silica filler treated with octamethylcyclotetrasiloxane was added incrementally in the same manner. There was obtained a silanol-containing polydimethylsiloxane composition consisting of 25 parts of filler, per 100 parts of silanol-terminated polydimethylsiloxane. It had a viscosity of about 410,000 centipoises at 25° C. The time required to mix the octamethylcyclotetrasiloxane treated filler and fluid was about 3 times the period of time needed to mix the same silanol-containing polydimethylsiloxane and filler treated in accordance with the practice of the invention.

Another silanol-containing polydimethylsiloxane composition was made by adding incrementally to 100 parts of the above silanol-terminated polydimethylsiloxane, 25 parts of untreated pyrogenic silica filler. It was apparent, however, that as soon as about 8 parts of the filler was added, the mixture began to structure. It became extremely difficult to stir. In order to completely incorporate all of the filler into the silanol-terminated polydimethylsiloxane, the mixture was treated with steam for 2 hours at 115° C. There was obtained a silanol-containing polydimethylsiloxane composition having a viscosity of about 420,000 centipoises at 25° C.

Portions of the respective silanol-containing polydimethylsiloxane compositions were observed over a period of several months, to determine if any of the mixtures increased in viscosity.

The following table shows the results obtained, where "blend" is the mixture of silica filler and silanol fluid, "Smith" is the composition of the present invention, "Lucas" is the composition containing silica filler treated with octamethylcyclotetrasiloxane and "control" is the composition containing untreated silica filler, "viscosity" represents initial viscosity, "months" is the shelf period, and "percent increase" is the increase in viscosity over the initial viscosity:

|  | Viscosity | Months | Percent increase |
|---|---|---|---|
| Blend: | | | |
| Smith | 400,000 | 6 | 20 |
| Lucas | 410,000 | 4 | (1) |
| Control | 420,000 | 3 | (1) |

[1] Gelled.

EXAMPLE 2

A silanol-containing polydimethylsiloxane composition having a viscosity of 810,000 centipoises at 25° C. was made in accordance with the practice of the invention, by mixing together 100 parts of a silanol-terminated polydimethylsiloxane having a viscosity of about 102,000 centipoises at 25° C., 35 parts of pyrogenic silica filler having a surface area of 200 square meters per gram, and 57 parts of a polydimethylsiloxane fluid having a viscosity of about 50 centipoises at 25° C., and trimethylsiloxy chain-stopping units. The pyrogenic silica filler was prepared by contacting the filler with ammonia for 3 hours at 25° C., while the filler was under a high degree of agitation. The filler was then treated with hexamethyldisilazane. The treatment with hexamethyldisilazane was achieved by adding hexamethyldisilazane to the silica filler until a mixture containing about 20 percent by weight of hexamethyldisilazane was formed. The mixture was then heated with agitation for 3 hours at 130° C. and then dried for 24 hours at 150° C. The resulting pyrogenic silica filler was found to be free of silanol absorption at 3760 cm.$^{-1}$ and had about 7 percent by weight of chemically combined trimethylsiloxy units based on the weight of filler. Analysis of the filler was achieved with infrared and standard carbon-hydrogen analysis based on weight of carbon dioxide and water.

A curable composition was prepared by adding 2.4 parts of phenyltriethoxysilane to 80 parts of the above silanol - containing polydimethylsiloxane composition along with 0.4 part of dibutyl tin dilaurate. The mixture was poured onto a chrome-plated steel mold to a thickness of .075 inch and allowed to cure for 96 hours at 25° C. A portion of the silanol-containing polydimethylsiloxane composition also was observed over a period of several months to determine whether it experienced any change in viscosity.

The above procedure was repeated except that in place of the pyrogenic silica filler utilized in making the silanol-containing polydimethylsiloxane composition of the present invention, there was employed equal parts by weight of a pyrogenic silica filler treated in accordance with the method of Lucas, utilizing octamethylcyclotetrasiloxane. The initial viscosity of the resulting silanol-containing polydimethylsiloxane composition was found to be 750,000 centipoises at 25° C. A portion of the silanol-containing polydimethylsiloxane also was observed over a period of several months under the same conditions used with the silanol-containing polydimethylsiloxane made in accordance with the invention. A curable composition also was made following the previously described procedure, except there was substituted for the 35 parts of the pyrogenic silica filler contacted with ammonia and thereafter treated with hexamethyldisilazane, a pyrogenic silica filler that had been treated with octamethylcyclotetrasiloxane.

The table below shows the shelf results obtained with the respective compositions where the terms are as previously defined:

|  | Viscosity | Months | Percent increase |
|---|---|---|---|
| Smith | 810,000 | 4 | 13 |
| Lucas | 750,000 | 2 | (1) |

[1] Gelled, 20,000,000 centipoises at 25° C.

The following table shows the results obtained with cured samples of the respective curable compositions, where "H" is hardness (Shore A), "T" is tensile (p.s.i.), "E" is elongation (percent) and "T'" is tear (p.i.):

|  | H | T | E | T' |
|---|---|---|---|---|
| Smith | 27 | 610 | 700 | 125 |
| Lucas | 30 | 580 | 550 | 48 |

EXAMPLE 3

A silanol-containing organopolysiloxane composition was made in accordance with the practice of the invention by mixing 200 parts of the pyrogenic silica filler of Example 2, and 937 parts of a silanol-containing organopolysiloxane. The silanol-containing organopolysiloxane consisted of 545 parts of a silanol-terminated polydimethylsiloxane having a viscosity of 102,000 centipoises at 25° C., 256 parts of a tertiary butoxy containing polydimethylsiloxane having a viscosity of about 3000 centipoises at 25° C., which was terminated with a mixture of silanol radicals and tertiary butoxy radicals, and 136 parts of a silanol-containing process aid. The silanol-containing process aid consisted essentially of chemically combined methylsiloxy units, dimethylsiloxy units, and trimethylsiloxy units, as described in Beers Pat. 3,382,205, assigned to the same assignee as the present invention. The resulting silanol-containing organopolysiloxane composition had an initial viscosity of about 650,000 centipoises at 25° C. After a shelf period of 4 months at 25° C., its viscosity increased about 5 percent.

There was added to 80 parts of the above silanol-containing organopolysiloxane composition, about 2½ parts of ethylsilicate and 0.3 part of stannous octoate. A portion of the resulting curable composition was poured onto a chrome-plated steel mold at 25° C. After 96 hours there was obtained a tack-free sheet. A slab was cut from the tack-free sheet. It had a tensile of 700 (p.s.i.), and elongation of 525 (percent), a tear of 173 (p.i.), and a durometer of 41.

EXAMPLE 4

A silanol-containing organopolysiloxane composition was prepared in accordance with the practice of the invention consisting essentially of 200 parts of a pyrogenic silica filler, 545 parts of a silanol-terminated polydimethylsiloxane fluid having a viscosity of about 99,000 centipoises at 25° C., and 300 parts of a polydimethylsiloxane fluid having a viscosity of 500 centipoises at 25° C., and a mixture of terminal trimethylsiloxy units and silanol chain-stopping units. The pyrogenic silica filler was prepared by contacting a fume silica having a surface area of about 325 square meters per gram, which had been treated with octamethylcyclotetrasiloxane, with ammonia at a temperature of about 25° C. for 1½ hours. The resulting pyrogeneic silica filler was mixed with 7½ percent by weight of hexamethyldisilazane based on the weight of silica filler. The resulting mixture was agitated at a temperature of 130° C. for 3 hours. There was then added 0.5 percent by weight of water based on the weight of mixture. The mixture was then heated for 2 additional hours at 130° C. and dried for 24 hours at 150° C. in a circulating air oven. An infrared spectrum of filler showed it had about 2.2 percent by weight of chemically combined trimethylsiloxy units based on the filler weight and that it was free of infrared absorbance at 3760 cm.$^{-1}$.

The resulting blend of pyrogenic silica filler and silanol-containing organopolysiloxane had a viscosity of 120,000 centipoises at 25° C. A portion of the silanol-containing organopolysiloxane composition was found to have substantially the same viscosity after a 4-month shelf period at 25° C.

A curable composition was prepared with the above-described silanol-containing organopolysiloxane composition by adding 2.25 parts of ethylsilicate and 0.2 part of dibutyl tin dilaurate to 100 parts of the silanol-containing organopolysiloxane composition. The resulting curable mixture cured at room temperature to an elastomeric product after 96 hours. It had a tensile (p.s.i.) of 850, an elongation (percent) of 470, a tear (p.i.) of 175, and a durometer of 47.

EXAMPLE 5

A silanol-containing organopolysiloxane composition was prepared by stirring together 700 parts of a silanol-terminated polydimethylsiloxane having a viscosity of 320,000 centipoises at 25° C., 500 parts of a polydimethylsiloxane fluid having terminal trimethylsiloxy chain-stopping units and a viscosity of 50 centipoises at 25° C., and 245 parts of a pyrogenic silica filler. The pyrogenic silica filler was prepared by agitating a mixture of fumed silica having a surface area of 200 square meters per gram, and 20 percent by weight of the fumed silica of hexamethyldisilazane. The mixture of the fumed silica and the hexamethyldisilazane was agitated for 24 hours at 300° F. and then dried in the oven for 24 hours at 300° F. An infrared spectrum of the silica filler showed it was free of absorbance at 3760 cm.$^{-1}$, and that it contained about 7 percent by weight of chemically combined trimethylsiloxy units. The resulting silanol-containing organopolysiloxane composition has a viscosity of 600,000 centipoises at 25° C. After a shelf period of 3 months, its viscosity had increased to about 11 percent.

A curable composition was made by incorporating into 100 parts of a silanol-containing organopolysiloxane composition, 3 parts of phenyltriethoxysilane and 0.2 part of stannous octoate. The curable mixture was poured onto a chrome-plated steel mold and allowed to cure under atmospheric conditions at 25° C. An elastomeric product was obtained having a tensile (p.s.i.) of 732, an elongation (percent) of 820, a tear (p.i.) of 135, and a hardness (Shore A) of 19.

The above procedure was repeated except that in place of the pyrogenic silica filler made in accordance with the teaching of the present invention, there was employed a fumed silica having a surface area of 200 square meters per gram, treated with octamethylcyclotetrasiloxane in accordance with the Lucas method. It was found that the silanol-containing composition had converted to a useless gel after about a 2-month shelf period. A curable composition was prepared by the above method. An elastomeric product was obtained from the composition having a tensile (p.s.i.) of 580, an elongation (percent) of 550, a tear (p.i.) of 48, and a hardness (Shore A) of 30.

Those skilled in the art would know that the above examples establish that the silanol-containing organopolysiloxane compositions of the present invention have superior shell life when compared to prior art mixtures of pyrogenic silica filler and silanol-containing organopolysiloxanes. In addition, the compositions of the present invention provide for room temperature vulcanizing organopolysiloxane compositions which are convertible to elastomers exhibiting superior physical properties, as compared to elastomers made from prior art room temperature vulcanizing organopolysiloxane compositions.

While the foregoing examples have of necessity been limited to only a few of the very many variables within the scope of the present invention, it should be understood that the present invention covers a much broader class of silanol-containing organopolysiloxane compositions, comprising silanol-containing organopolysiloxane consisting essentially of chemically combined units of Formula 2, and pyrogenic silica filler having chemically combined units of Formula 1. In addition, the present invention is also directed to a much broader class of various methods which can be employed to treat the pyrogenic silica filler utilized in the practice of the present invention, as well as methods for making the silanol-containing organopolysiloxane. All of these materials are prepared by methods specifically illustrated in the examples above and described further in the foregoing description of the present invention.

What I claim as new and desire to secure by Letters Patent of the United States is:

1. A silanol-containing organopolysiloxane composition having a substantially constant viscosity over an extended period of time, comprising
   (A) 100 parts of an organopolysiloxane having a viscosity up to 500,000 centipoises at 25° C. consisting essentially of chemically combined units of the formula, (2)    $R'_2SiO$ 

and terminal units selected from the class consisting of,
      (i) silanol units of the formula, (3)    $HOR'_2SiO$ 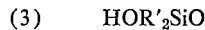

and
      (ii) a mixture of (i) and organosiloxy chain-stopping units of the formula, (4)    $R''R'_2SiO$ 

wherein (ii), the ratio of (i) to the organosiloxy chain-stopping units has a value exceeding 1, and
   (B) 10 to 50 parts of a pyrogenic silica filler having a surface area of at least 50 square meters per gram which is substantially free of infrared absorbance at 3760 cm.$^{-1}$, and from 1 to 20 percent by weight of chemically combined triorganosiloxy units of the formula, $R_3SiO$ 

where R is selected from monovalent hydrocarbon radicals and halogenated monovalent radicals, R' is selected from the class consisting of monovalent hydrocarbon radicals, halogenated monovalent hydrocarbon radicals and cyanoalkyl radicals, and R'' is selected from the class consisting of R radicals and $R_3CO$ radicals.

2. A silanol-containing organopolysiloxane composition in accordance with claim 1, where the organopolysiloxane is a silanol-terminated organopolysiloxane.

3. A silanol-containing organopolysiloxane composition in accordance with claim 1, where the organopolysiloxane contains both terminal trimethylsiloxy chain-stopping units and silanol radicals and the ratio of the silanol radicals to the trimethylsiloxy chain-stopping units has a value exceeding one.

4. A silanol-containing organopolysiloxane composition in accordance with claim 1, where the triorganosiloxy units on the surface of the pyrogenic silica filler are trimethylsiloxy units.

5. A silanol-containing organopolysiloxane composition in accordance with claim 1, where the organopolysiloxane is a polydimethylsiloxane.

6. A silanol-containing organopolysiloxane composition in accordance with claim 1, where the pyrogenic silica filler has from 6 to 12 percent by weight of chemically combined trimethylsiloxy units.

7. A silanol-containing organopolysiloxane composition in accordance with claim 1, where the organopolysiloxane is a silanol-containing polydimethylsiloxane having terminal tertiary butoxy radicals and silanol radicals and a ratio of silanol radicals to tertiary butoxy radicals having a value exceeding one.

8. A silanol-containing organopolysiloxane composition in accordance with claim 1, containing a polydimethylsiloxane having terminal trimethylsiloxy units.

9. A silanol-containing organopolysiloxane composition in accordance with claim 1, comprising (A) 100 parts of a polydimethylsiloxone having a viscosity up to 500,000 centipoises at 25° C., consisting essentially of chemically combined dimethylsiloxy units and terminal silanol radicals, (B) 10 to 35 parts of a pyrogenic silica filler free of infrared absorbance at 3760 cm.$^{-1}$, having a surface area of at least 200 square meters per gram, and from about 1 to 2 percent by weight of trimethylsiloxy units and from 5 to 10 percent by weight of dimethylsiloxy units.

10. A silanol-containing organopolysiloxane composition in accordance with claim 1, comprising (A) 100 parts of a polydimethylsiloxane having a viscosity up to 500,000 centipoises at 25° C., and terminal units selected from silanol radicals and an organosiloxy chain-stopping unit selected from the class consisting of trimethylsiloxy units and dimethyl tertiary butoxy siloxy units where the ratio of said silanol radicals to said organosiloxy chain-stopping units has a value exceeding one.

11. A method for making a silanol-containing organopolysiloxane composition having a substantially constant viscosity over an extended period of time comprising
(A) 100 parts of silanol-containing organopolysiloxane and (B) 15 to 35 parts of a pyrogenic silica filler, which method comprises uniformly mixing (A) and (B), where (A) is an organopolysiloxane having a viscosity up to 500,000 centipoises at 25° C. consisting essentially of chemically combined units of the formula, $$R'_2SiO$$

and terminal units selected from the class consisting of,
(i) silanol units of the formula, $$HOR'_2SiO$$

and
(ii) a mixture of (i) and organosiloxy chain-stopping units of the formula, $$R''R'_2SiO$$

where in (ii), the ratio of (i) to the organosiloxy chain-stopping units has a value exceeding one, and
(8) is a pyrogenic silica filler having a surface area of at least 50 square meters per gram, which is substantially free of infrared absorbance at 3760 cm.$^{-1}$, having from 6 to 12 percent by weight of chemically combined triorganosiloxy units of the formula, $$R_3SiO$$

where R is selected from monovalent hydrocarbon radicals and halogenated monovolent radicals, R' is selected from the class consisting of monovalent hydrocarbon radicals, halogenated monovalent hydrocarbon radicals and cyanoalkyl radicals, and R'' is selected from the class consisting of R radicals and R$_3$CO radicals.

12. A method for making a silanol-containing organopolysiloxane composition having a substantially constant viscosity over an extended period of time in accordance with claim 11, which comprises (1) contacting at a temperature between 20° C. to 150° C., a pyrogenic silica filler having a surface area of at least 50 square meters per gram, with at least 3 percent by weight of the filler of a silylating agent of the formula, $$(R_3Si)_aZ$$

in the presence of from 0.1 to 1 percent by weight of water, based on the weight of filler to provide for the production of (A) a pyrogenic silica filler which is substantially free of infrared absorbance at 3760 cm.$^{-1}$, and having from 1 percent to 20 percent by weight of chemically combined triorganosiloxy units of the formula, $$R_3SiO$$

and (2) mixing (A) with (B) the silanol-containing organopolysiloxane of claim 11, where R is selected from monovalent hydrocarbon radicals and halogenated monovalent radicals, $a$ is an integer equal to 1 or 2, and Z is a radical selected from the class consisting of —OH. —NR$_2$, —ONR$_2$, —SR, $$-O\overset{O}{\overset{\|}{C}}R-O-\overset{R}{\underset{}{N}}-\text{and}-S-$$

13. A method in accordance with claim 12, where said pyrogenic silica filler has been contacted at temperatures in the range of between 10° C. to 150° C. with at least 0.25 percent by weight of ammonia, based on the weight of filler.

14. A method in accordance with claim 12, where prior to contacting said pyrogenic silica filler with said silylating agent, said pyrogenic silica filler is contacted with a diorganocyclotetrasiloxane of the formula.

where R is as defined in claim 12.

15. A method in accordance with claim 12, where said silylating agent is hexamethyldisilazane.

16. A method for making a silanol organopolysiloxane composition having a subtsantially constant viscosity over an extended period of time, in accordance with claim 11, which comprises (1) contacting at a temperature between 20° C. to 150° C., a pyrogenic silica filler having a surface area of at least 50 square meters per gram, with at least 7.5 percent by weight of the filler of hexamethyldisilazane in the presence of from 0.2 percent to 1.0 percent of water, based on the weight of the filler, to provide for the production of (A) a pyrogenic silica filler which is substantially free of infrared absorbance at 3760 cm.$^{-1}$, having from 6 percent to 12 percent by weight of chemically combined trimethylsiloxy units, and (2) mixing (A) with (B) the silanol-containing organopolysiloxane.

17. A method in accordance with claim 16, where said pyrogenic silica filler is contacted with at least 0.25 percent by weight of ammonia based on the weight of the filler at temperatures in the range of between 20° C. to 150° C.

18. A method in accordance with claim 16, where said pyrogenic silica filler is contacted with octamethylcyclotetrasiloxane prior to being contacted with hexamethyldisilazane.

19. A method in accordance with claim 16, which comprises (1) contacting at a temperature between 20° C. to 150° C., a pyrogenic silica filler having a surface area of at least 50 square meters per gram, with at least 7.5 percent by weight of the filler of hexamethyldisilazane to provide for the production of (A) a pyrogenic silica filler which is substantially free of infrared absorbance at 3760 cm.$^{-1}$, having from 6 percent to 12 percent by weight of chemically combined trimethylsiloxy units, and (2) mixing (A) with (B) a silanol-terminated polydimethylsiloxane having a viscosity up to 500,000 centipoises at 25° C.

20. A method in accordance with claim 16, which comprises (1) contacting at a temperature between 20° C. to 150° C., a pyrogenic silica filler having a surface area of at least 50 square meters per gram, with at least 7.5 percent by weight of the filler of hexamethyldisilazane to provide for the production of a pyrogenic silica filler which is substantially free of absorbance at 3760 cm.$^{-1}$, having from 6 percent to 12 percent by weight of chemically combined trimethylsiloxy units, and (2) mixing (A) with (B) a silanol-containing polydimethylsiloxane having a viscosity of up to 500,000 centipoises at 25° C., and terminal units selected from the class consisting of (a) a mixture of dimethylhydroxysiloxy units and trimethylsiloxy units, and (b) a mixture of dimethylhydroxysiloxy units and dimethyl-tert-butoxysiloxy units, wherein (a) and (b) the ratio of the dimethylhydroxysiloxy units to the other units respectively has a value greater than one.

21. A method in accordance with claim 19, where the pyrogenic silica filler has been contacted with ammonia and octamethylcyclotetrasiloxane.

22. A method in accordance with claim 20, where the pyrogenic silica filler has been contacted with ammonia and octamethylcyclotetrasoiloxane.

23. A method in accordance with claim 11, for making a silanol-containing organopolysiloxane composition having a substantially constant viscosity over an extended period of time which comprises (1) contacting at a temperature between 20° C. to 150° C., a pyrogenic silica filler having a surface area of at least 50 square meters per gram, with at least 7.5 percent by weight of the filler of hexamethyldisilazane, in the presence of from 0.2 percent to 1.0 percent by weight of water, based on the weight of filler, where said filler is also contacted with octamethylcyclotetrasiloxane, and at least 0.25 percent of ammonia, based on the weight of the filler, to provide for the production of (A) a pyrogenic silica filler which is substantially free of infrared absorbance at 3760 cm.$^{-1}$, and having from 1 percent to 2 percent by weight of chemically combined trimethylsiloxy units, and (2) mixing (A) with (B) a silanol-terminated polydimethylsiloxane having a viscosity of up to 500,000 centipoises at 25° C.

24. A method for making a silanol-containing organopolysiloxane composition having a substantially constant viscosity over an extended period of time in accordance with claim 11, which comprises (1) contacting at a temperature between 20° C. to 150° C., a pyrogenic silica filler having a surface area of at least 50 square meters per gram with at least 7.5 percent by weight of the filler of hexamethyldisilazane, in the presence of from 0.2 percent to 1.0 percent of water based on the weight of filler, where said filler is contacted with octamethylcyclotetrasiloxane and at least 0.25 percent of ammonia based on the weight of the filler, to provide for the production of a pyrogenic silica filler which is substantially free of infrared absorbance at 3760 cm.$^{-1}$, having from 1 percent to 2 percent by weight of chemically combined trimethylsiloxy units, and (2) mixing the filler of (1) with a silanol-containing polydimethylsiloxane having a viscosity up to 500,000 centipoises at 25° C. which has terminal units selected from the class consisting of a mixture of silanol radicals and trimethylsiloxy units and a mixture of silanol radicals and tertiary butoxy units where the ratio of silanol radicals to said trimethylsiloxy units or tertiary butoxy units in said mixtures has a value greater than one.

References Cited

UNITED STATES PATENTS

| | | |
|---|---|---|
| 3,004,859 | 10/1961 | Lichtenwalner. |
| 3,015,645 | 1/1962 | Tyler. |
| 3,122,516 | 2/1964 | Polmanteer. |
| 3,122,520 | 2/1964 | Lentz. |

MORRIS LIEBERMAN, Primary Examiner

L. T. JACOBS, Assistant Examiner